(No Model.)
L. PORRI.
WHEEL FENDER FOR TRAM CARS OR OTHER VEHICLES.
No. 417,085. Patented Dec. 10, 1889.
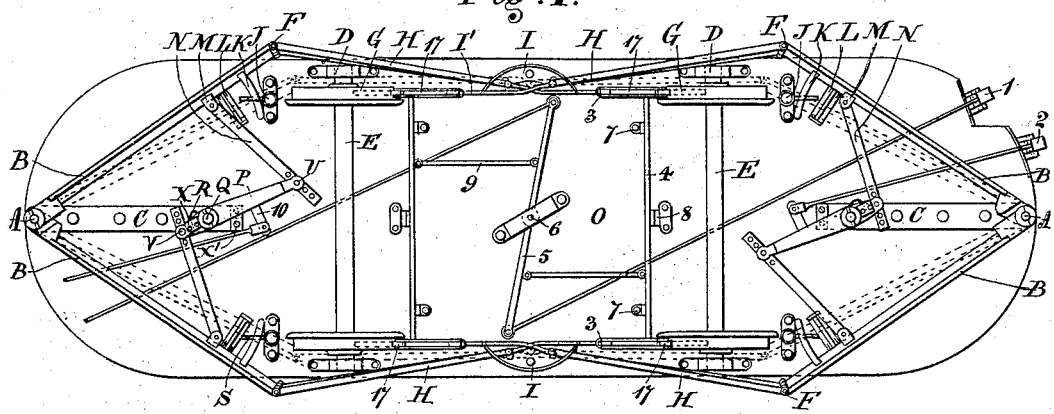
Fig. 1.
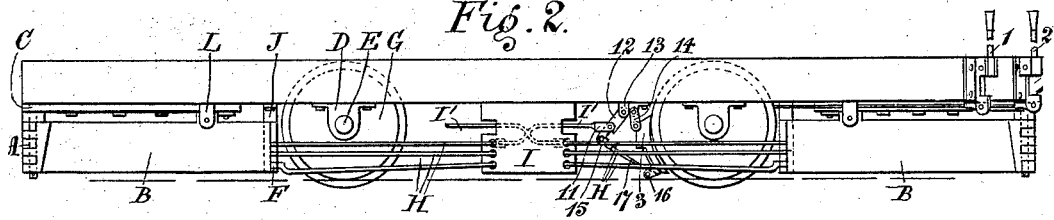
Fig. 2.
Fig. 3.
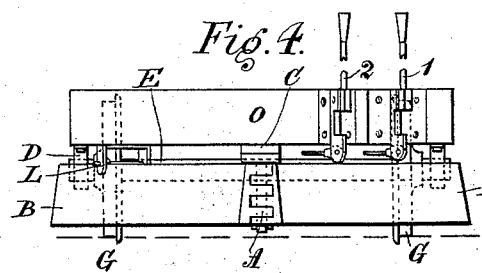
Fig. 4.
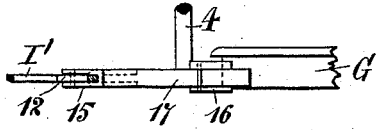
Fig. 5. Fig. 6.
Fig. 7.
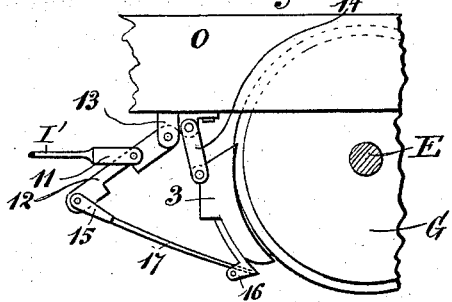
Fig. 8.
Witnesses.
Bennett Jackson
Harry Ward
Inventor.
Louis Porri
per J. P. Bayly
Attorney.

United States Patent Office.

LOUIS PORRI, OF GREAT GRIMSBY, COUNTY OF LINCOLN, ENGLAND.

WHEEL-FENDER FOR TRAM-CARS OR OTHER VEHICLES.

SPECIFICATION forming part of Letters Patent No. 417,085, dated December 10, 1889.

Application filed August 13, 1888. Serial No. 282,756. (No model.) Patented in England December 20, 1887, No. 17,480, and January 21, 1888, No. 937.

*To all whom it may concern:*

Be it known that I, LOUIS PORRI, a subject of the Queen of Great Britain, residing at 4 Kent Street, Great Grimsby, in the county of Lincoln, England, have invented a new and useful Apparatus for Application to the Wheels of Tram-Cars, Locomotive-Engines, Omnibuses, and Wheeled Vehicles Generally, to prevent accidents, (for one portion of which I have obtained a patent in Great Britain, No. 17,480, bearing date December 20, 1887, and for the remaining portion of which I have obtained provisional protection in Great Britain, No. 937, bearing date January 21, 1888,) of which the following is a specification.

My invention consists of an apparatus to act as a spring protector or guard for the purpose of preventing bodies from being run over by the wheels of vehicles when fitted with the said apparatus, minimizing the force of the blow when bodies are struck by vehicles in motion, and automatically stopping the vehicle by applying any brake to the wheels, or, more particularly, the emergency-brake attachment, which forms a part of my invention.

The object of my invention is to construct an apparatus to tram-cars, locomotive-engines, and the like, to prevent any bodies or the like coming into contact with the wheels, and to so act that should any person or body be knocked down in front of a vehicle fitted with this apparatus the person or body when on the ground would be struck by the protector, which forms the chief part of the said apparatus, the effect of this being to press the protectors backward and inward, thus minimizing the force of the blow, moving the person or body off the track, and, if required, automatically applying any brake with which the vehicle may be fitted for that purpose, or bringing into action the brake emergency attachment, as shown on the accompanying drawings.

The brake attachment consists of a metal tongue connected with the ordinary apparatus, suspended in proximity to the wheels, and it is brought into action by bodies striking the protectors in front of the vehicle, when the tongue, intervening between the wheels and the ground or rail contact, immediately draws on the brake and stops the vehicle. The attachment can also be utilized by the driver or other person in charge of the vehicle by the movement of a lever-handle.

I do not claim the ordinary brake apparatus fixed to the car, as described in the accompanying drawings, as any part of my invention, and it is merely introduced to show the action of my attachment, which can be fitted to any kind of brake for use in emergency, while at the same time not interfering with the ordinary working of the brake.

In order that my invention may be thoroughly understood, I now proceed to describe the accompanying drawings thereof, reference being had to letters and figures marked thereon.

Figure 1 represents the under side of a tram-car, showing the whole of the apparatus (fitted in duplicate at each end of the vehicle) in its stationary position, the dotted lines giving the position of the apparatus when the protectors are struck by any body or the like. The body of the tram-car (marked O) has fixed at each end of the under side a protector (marked B) hung on a pin and hinged at A, sloping away toward the front F, where are hinged the guard-bars H. The ends of the said guard-bars enter holes in a semicircular support, (marked J,) with sufficient play to permit the guard-bars to move in or out freely, the object of these bars being to prevent bodies or the like from getting underneath the tram-car at the sides or coming into contact with the sides of the wheels, and also to convey the motion, by means of a connecting-rod I', to the brake attachment, (indicated by numerals,) which acts upon the two hind wheels. In the front and back center is fixed a long plate (marked C) bolted to the vehicle, to which is fastened the pin on which the protectors are hung and hinged at the point A. Fixed at or near the end of the said plate, on the body of the tram-car, is a strong bolt, (marked Q,) with a strong spiral spring (marked R) running round the bolt, one end of the spring being fixed on the plate C, with a clutch-piece X', and the other end being fixed to a lever-arm P, also with a clutch-piece X, the lever-arm working on the bolt, and being pressed down in position by a washer and a key-pin driven through the end of the bolt. Each end of the lever-arm is provided with jaws, (marked V and U,) on which the rods marked N are fixed to work on centers, the other ends of the rods being pivoted to the inner side of the protectors at the point M, so that when either of the protectors strikes any body it forces the lever-arm and brings the apparatus into the position marked by the dotted lines, at the same time inserting the tongues (marked 17) beneath both hind wheels. At the point L each protector is provided with a pulley-wheel and rims on the under side of a rod fixed to a frame, which is bolted to the body of the tram-car in such a position as to stop the spring from forcing the protectors outward, and at the same time, by means of the said pulley-wheel, to help to sustain the weight of the protector. At the ends of the protectors toward the hinged part F is fixed a curved guide-bar, (marked K,) which, when the protectors are pressed inward, slides over the pin S of a sliding bolt inside a slotted tube, (marked J.) This guide-bar K is placed at such an angle that when the tramcar is upon the rails and the protectors are stationary the pin S rests upon the guide-bar and holds the bolt up with its lower end level with the bottom edge of the protectors. Upon the protectors striking any body as they close, the guide-bar slides along the pin S, and the bolt gradually descends by its own gravity to the ground behind the protectors, so as to prevent any portion of the body getting underneath the protectors and coming into contact with the wheels. The wheels are marked G, fixed to the axle E, and the bearings bolted to the body of the tram-car are marked D.

The mechanism of the brake attachment is marked in numerals on each of the figures 7 and 8.

Fig. 2 represents a side elevation of the body of a tram-car, showing the apparatus fixed in its proper position and ready for action.

Fig. 3 shows a side elevation of the bolt Q, fixed to the plate C, the spiral spring R, the clutch-pieces X and X', with the side view of the lever-arm P, and the jaws V and U at each end of the said lever-arm.

Fig. 4 represents the front or end of the tram-car body with the apparatus, giving the stationary position of the protectors.

Fig. 5 is the front view of the sliding bolt inside the slotted tube J, with the pin marked S fixed to the bolt, the pin sliding in the slot.

Fig. 6 is the side view of Fig. 5.

Fig. 7 is the plan of the brake attachment, describing the position of the tongue.

Fig. 8 is a view of the brake attachment underneath the body of the car, connected with the guard-bars by the connecting-rod I'.

In application to horse-drawn vehicles the front part at A will be covered by the animal; but where this is not the case, if necessary, it may be masked by a suitably-shaped buffer, and also, where desirable, the protectors may be made double-acting, when fitted in duplicate, by connecting the respective lever-arms.

In adapting the apparatus to locomotive-engines and other vehicles, if necessary, I can make certain modifications without departing from the nature of my invention by altering the shape and angle of the said protectors and the position, make, and application of the spring, provided that the principle of movable protectors acting upon a spring for the purpose of moving any body or the like clear of the track of the vehicle, minimizing the force of the blow, or automatically applying any brake, be retained. Therefore I claim to construct my invention to any size or shape and to apply the spring-power in any manner suitable to adapt the same to any and every description of locomotive-engine, carriage, or wheeled vehicle, for the purpose of moving any body or the like clear of the track, minimizing the force of the blow, or automatically applying the brake.

It is intended that the shape, angle, and motion of the apparatus when fitted to a tram-car shall, as the car advances, have the effect of impelling any body sidewise clear of the front wheels, and that at the side it shall be protected from being run over by the hind wheels, or caught by the duplicate protector at the other end of the tram-car by the guard-bars.

Like letters refer to like parts in each of the figures.

A represents the hinged portion of the protectors; B, the protectors; C, the long plate to which the pin is fixed, upon which the protectors are hung and bolted to the body of the vehicle; D, bearings; E, axle; F, hinged portion of the guard-rods to the protectors; G, wheels; H, guard-rods; I, semicircular support for the guard-rods to work in; J, the slotted tube with sliding bolt; K, curved guide; L; the guide-rod and frame; M, jaw on protector; N, connecting-rod; O, body of car; P, lever-arm; Q, bolt or pin; R, spiral spring; S, pin; V, jaw on one end of lever-arm; U, jaw on other end of lever-arm; X', clutch to hold the bottom end of spring; X, clutch to hold the top end of spring; I', connecting-rods between brake attachment and guard-bars; 1, pull to common brake; 2, pull to protectors and brake attachment; 3, brake; 4, connecting-rod; 5, central lever; 6, center pin; 7, stop-pins; 8, spring; 9, connecting-bar; 10, pull-connector to lever-arm; 11, jaws of connecting-rod I'; 12, lever; 13, jaw on which the lever is hung; 14, lever-arm to brake; 15, jaw at the end of the tongue; 16, guide for tongue; 17, tongue.

Having now fully described the nature and object of my invention and the manner in which the same is to be performed, I claim as new and novel the following:

1. The combination of the guard-rods and protectors, constructed and operating as described, with the connecting mechanism, all arranged as and for the purpose specified, substantially as described.

2. The combination of the pull lever-rods with the brake and the guard-rods and mechanism for reciprocating the same to operate in unison therewith, substantially as described.

3. In the herein-described wheel fender, the bolt sliding in a tube or socket fixed in front of the wheels of vehicles to prevent bodies coming into contact with the wheels, substantially as herein described, and according to the accompanying drawings.

LOUIS PORRI.

Witnesses:
B. JACKSON,
H. WARD.